United States Patent [19]

Wallace

[11] 4,133,042
[45] Jan. 2, 1979

[54] AUTOMATIC PINSETTER CONTROLLER SYSTEM

[76] Inventor: Ben W. Wallace, 95 Walnut St., Brookline, Mass. 02146

[21] Appl. No.: 861,844

[22] Filed: Dec. 19, 1977

[51] Int. Cl.² ........................... G06F 3/04; G06F 5/04
[52] U.S. Cl. .................................. 364/900; 273/54 C; 235/92 G
[58] Field of Search .......... 235/92 GA; 273/37, 54 C; 346/25; 364/200 MS, 900 MS

[56] References Cited

U.S. PATENT DOCUMENTS

| | | | |
|---|---|---|---|
| 3,252,149 | 5/1966 | Weida et al. | 364/200 |
| 3,516,068 | 6/1970 | Howard et al. | 364/900 |
| 3,665,407 | 5/1922 | Negishi | 273/54 C |
| 3,710,080 | 1/1973 | Ellis | 235/92 GA |
| 3,907,290 | 9/1975 | Fischer et al. | 235/92 GA |
| 3,931,499 | 1/1976 | Ellis | 235/92 GA |
| 3,974,483 | 8/1976 | Brunson | 364/900 |
| 4,032,946 | 6/1977 | Wakatsuki et al. | 364/900 |

*Primary Examiner*—Harvey E. Springborn
*Attorney, Agent, or Firm*—James J. Cannon, Jr.

[57] ABSTRACT

A microprocessor controlled automatic pinsetter controller system providing an operator with both electrical and financial control over a plurality of automatic pinsetters in a bowling alley such that the operator can control from a single keyboard console the electrical operation of the pinsetters, the charges to his customers for their use, and cumulative financial data on the alley. The automatic pinsetter controller system has a digital data processing device having a control unit including a keyboard for operator data entry, a display for display of system data, a microprocessor for processing data and is connected to a command decoder at each pinsetter in a bowling alley by a serial data bus. Each pinsetter in a bowling alley is connected electrically to a command decoder unit which converts electrical signals from and to the pinsetter to the automatic pinsetter controller system. The command decoder includes a universal asynchronous receive and transmit unit which converts parallel data to serial data and vice versa for transmission over the serial data bus to the control unit. The processing device of this control unit centralizes the electrical control of all the pinsetters in a bowling alley and thereby provides a simple accounting means to calculate and bill the use of the pinsetters and maintain cumulative financial records of the alley.

9 Claims, 4 Drawing Figures

AUTOMATIC PINSETTER CONTROLLER SYSTEM

BACKGROUND OF THE INVENTION

1. Field of the Invention

This invention pertains to control units for automatic pinsetting units used in bowling alleys and in particular to units which can electrically control the operation of a large number of such pinsetters from a single, microprossor-controlled console. The system of the present invention additionally provides data about the utilization of the pinsetters which enables an operator system console to calculate and display their billable use and provide the console operator with the total customer charges for the use of one or more lanes of a bowling alley and the pinsetters associated therewith, as well as provide the bowling alley owner with cumulative usage and finanical information about the pinsetters in his alley.

2. Description of the Prior Art

The status of automatic pinsetters for bowling alleys is well documented in the prior patent art, as is the art for their electrical control. Likewise, electronic scoring and bowling game counting is well known in the prior patent art. Some recent examples may be found in U.S. Pat. Nos. 3,974,483; 3,931,966; and 3,931,499. Automatic timekeeping and accounting units are also known to the prior patent art as in U.S. Pat. No. 3,943,526. To the best of the inventor's knowledge, however, no system for bowling alleys exists which performs either or both of the functions performed by the system of the present invention.

While many accounting systems exist for controlling the financial accounting of the use of lanes and pinsetters in bowling alleys, most such systems are manually operated and can be fallible in use. They are usually dependent upon the integrity of the personnel on duty at the control desk of the bowling alley.

The present invention is devoted to the solution of two problems presently existing in the operation of a bowling alley. The first problem is consolidating electrical controls for a plurality of lanes in a bowling alley to facilitate operational control thereof and to cope with electrical emergencies. The second problem is adequate and accurate accounting for the use of each lane and pinsetter to provide fair billing to the customer, and cumulative financial information for the owner of a bowling alley to obtain a reasonable return on his investment.

A bowling alley has a number of automatic pinsetters, usually ranging from ten to one hundred, each serving one bowling lane, installed at the rear of the alley. In some bowling alleys the pinsetters may be supplied by different manufacturers or may be varying models. Each pinsetter has a number of electrical wires which are, in present use, used to turn the machine on or off, to count the number of cycles it goes through, to cause it to cycle when necessary, to inform the operator when a cycle has been made and sometimes to indicate malfunctions. Depending on the make and model of the individual pinsetter, as many as five to ten individual wires are run from each pinsetter at the rear of a bowling lane to the control desk of the bowling alley terminating in a large console through which the operator controls each lane and pinsetter individually. Normally all these wires from the pinsetters to the operator console are bundled together in an enormous cable terminating at the operator console. The operator console has discrete switches for each lane with lights and counters to provide the status of each lane and its pinsetter. From this discrete data, displayed individually for each lane, the attendant on duty must determine the bill for the use of each lane and for pinsetter. Since the present systems provide for no cumulative records, it is impossible for an owner to determine whether or not the attendant on duty has billed all the usage of the lanes and pinsetters.

The present invention addresses itself to both of these problems by providing a microprocessor controlled device which accumulates data about pinsetter cycles and time of use, consolidate their electrical signals changes it to digital data which it transmits over a serial data bus and then computes the billable charges from such data as well as cumulative usage and financial data. This system provides a command decoder in close proximity to each pinsetter to receive its electrical inputs. The command decoder has the same lines and performs the same functions as each individual wire from the pinsetter, but each command decoder is interconnected from pinsetter to pinsetter in a daisy chain manner to a two- wire data bus which runs from the rear of the bowling alley to the system control desk at the front of the alley. The combination of the command decoders and the data bus eliminates a vast amount of wireing between the pinsetters and the system control console and enables the system control console to be extremely simplified. The system control console can also issue commands over the same two-wire data bus in a multiplex fashion to each one of the command decoders. Thus, the transmission of data to and from the operator is system command console and the individual pinsetters is accomplished with a maximum of efficiency and a minimum of error and omission. The microprocessor of the system control unit uses a read-only memory to retain its program and a random access memory to store and retrieve data about the individual pinsetters, and rates of charge for purposes of electrical and financial control.

SUMMARY OF THE INVENTION

This invention pertains to a microprocessor controlled automatic pinsetter controller for bowling alleys which provides a console operator sitting at the cashier's desk of a bowling alley with simultaneous, electrical and financial control over the use of the lanes and their associated pinsetters. This invention is a digitally controlled system having as its primary component a small operator control console unit with a keyboard data entry means, a LED display, a microprocessor with associated memories and means to receive digital data input from all of the pinsetters in the bowling alley. A second component of the system is a command decoder which is attached to each pinsetter in close proximity thereto and customized to the make and model of its associated pinsetter to accept all electrical wires from the pinsetter and to interpret control information received and transmitted between the operator control console unit and the individual pinsetter. The third component of the system is a two-wire data bus which connects each of the individual command decoders to the operator's system console unit and serves as the physical means for the transmission of digital data between the other two units.

To simplify the exposition of the components of the system we shall begin with the command decoder. The command decoder is a device which is connected to each pinsetter, customized to the make and model of the pinsetter and receives the five to ten wires emanating from the pinsetter. These wires relate to turning the pinsetter on and off, whether the pinsetter is cycling counting the number of cycles it has made, initiating cycles upon request and frequently to indicate a malfunction of the pinsetter. All these wires are connected to the command decoder through a universal asynchronous receiver transmitter driven by a digital clock. Each command decoder has a unique eight bit digital address and contains circuitry to identify its address on incoming data or to add its address to outgoing data. Each command decoder is connected to the serial data bus through a frequency shift keying (FSK) devise. Thus the command decoder serves as a local interface to convert all electrical signals from a pinsetter into serial digital data for processing by the operator control console and digital data from system control unit to electrical signals to cause the pinsetter to operate as commanded.

The central operator system control unit is basically a microprocessor based computer which controls the overall operation of the system. The program for the microprocessor is stored in a read only memory (ROM). The data the system stores and processes is contained in a random access memory (RAM). A serial interface is utilized to interpret data to and from the pinsetters via the command decoders over the serial data bus. The operator system control unit also has a keyboard for operator input of data through a parallel interface and a LED display working through the same parallel interface to display requested data and computations to the operator.

In operation, the operator control unit issues commands over the two-wire data bus in a multiplex fashion to each one of the command decoders by transmitting the command serially in digital form. For example, the computer in the console control unit periodically questions each pinsetter as to its status at the rate of one hundred pinsetters per second. The pinsetter is a slow operating unit; nothing much can happen that will change its status as the system control console cycles through all the pinsetters in an alley. When the status query is received by a command decoder, after address verification it will check the status of its pinsetter and transmit that information back to the control console where it is examined and stored in the RAM if necessary. Thus, one function of the operator control console unit is to continuously monitor and record the status of every pinsetter connected to the system through a command decoder and the common serial data bus. This function is performed automatically as long as the console is plugged into the system.

The keyboard on the operator control console permits the operator to both input commands into the system and request data from the system. It has ten keys representing the ten digits and fourteen other keys. The "clear" key is used to clear any input functions in process an to clear the associated display. All other keyboard functions must reference a lane or a group of lanes. A lane may be referenced individually by keying it its number or lanes may be referenced in groups by pressing the "TO" key, such as "1 to 25" in which the next function requested will be performed on all these twenty-five lanes. Non-consecutive lanes may be referenced by pressing the "+" key between lane numbers. There are four pinsetter function keys. Once a lane has been reference, its pinsetter can be turned on by pushing the "ON" button and it can be turned off by pushing the "OFF" button. If the pinsetter is on, a new set of pins may be set up by pushing the "SET" button. This button makes the pinsetter go through one complete cycle. A fourth function permitted by the control console is "shadow" bowling, or practice bowling. The "SHAD" button turns the pinsetter on but does not allow it to set pins. It will, however, return the customer's ball. This permits practice bowling without continuous operation of the pinsetter. Thus, the four pinsetter function keys, ON, OFF, SET and SHAD electrically control the pinsetter and are the pinsetter machine control functions.

All the other keys are related to the internal accounting of the operator system control console. Like the pinsetter machine function keys, the internal function keys likewise must be referenced first by a lane or group of lane numbers. The accounting functions can be billed either by cost per unit of time or cost per box. As an example, if a customer desires to bowl on lane 5, lane 5 is initially turned non. At the conclusion of his bowling, lane 5 is turned off and the "5" and "TOTAL" keys are pressed. The display will show at the left the cost to the customer and at the right the boxes, or the number of times the pinsetter operated. To vary the cost the operator can press the "COST" key or "COST" "TIME" keys to enter the rate per box or hour, since rates change for various times and days. Thus the customer can be charged by time or lineage, according to the policy of the alley. A "TAX" button is included to compute and add applicable taxes to the customer's total bill. Tax rates are set internally by switches to prevent tampering. While the system is recording usage for an individual lane for customer billing purposes, it is also recording in the RAM that same data on a cumulative basis for financial control and management of the bowling alley. For example, if preventative maintenance is required on a pinsetter every 10,000 cycles, it is important to know the number of cycles made by the pinsetter. In the present system program, cumulative totals are stored on a daily and yearly basis.

It should be noted that during all the pinsetter machine functions and accounting functions initiated by the operator, the control console through its microprocessor and program is continuously sampling and recording the status of each pinsetter in the system, thus providing the basic input data for the pinsetter machine and accounting functions.

Error messages are conveyed to the operator by a display of all "eights".

The accounting functions keep track of two types of totals, time totals and cycle totals for each pinsetter, these types being the totals for the game, the totals for the day, and the totals for the year on a cumulative basis. For example, the operator can push FIVE, DAY, and TOTAL and have displayed the total time and lineage volume of lane five for the day.

The only other function key is the ZERO key which permits the operator to clear the game total to zero so that the next user of the lane can be properly billed. All other totals are kept internally in a cumulative basis. for security reasons. Additionally, they are stored in a battery powered back-up memory in the event of electrical failure. These cumulative totals may only be cleared by the use of security key in the back of the unit.

The system is also programmed to accommodate a power failure, even one of a momentary nature. When the system senses a power failure, it issues an OFF command to all pinsetters. When power is restored, the pinsetters stay off to permit a mechanic to check them to see if the will jam when turned back on. After any adjustments are made, the system control console will turn them on sequentially at one-half second intervals to prevent a sudden power surge.

The continuous transmission of data between the pinsetter command decoders and the operator console unit is in triple redundancy and its echoed back to insure reception. If errors occur in two consecutive cycles, the pinsetter number is displayed and an audio beep is sounded. Since the time interval between computer cycles is so short, pinsetter machine failures are usually discovered before they become serious. Essentially the command decoder is sending a status report. When the report is received at the control unit, it is sent back for a verification. At this point the system control unit knows only that it is talking to the right pinsetter. Error checking on noise signals is done by averaging the signals received. Since computer cycle time is so fast, the control console checks for the same return signal for ten to sixteen consecutive queries. If there is significant variation the next sixteen are checked. Thus, the error check for noise is very redundant.

The only interruptions to the continuous system cycling are the power failure, which is an absolute priority interrupt, and an operator keyed inquiry or command. Thus, the system of this invention is always cycling though all pinsetters to determine and record their use for other functions. It accomplishes this function by converting all necessary electrical information from the pinsetter to digital data in a small unit at the pinsetter, communicates it serially to a central operator console over a common two-wire data bus where it is processed and recorded. Likewise, commands to the pinsetters are similarly processed and communicated in digital form to the pinsetter where they are converted into electrical signals. This system saves a significant amount of wiring and provides for accurate accounting records for the owner of a bowling alley.

DESCRIPTION OF THE PREFERRED EMBODIMENT

Figure 1:
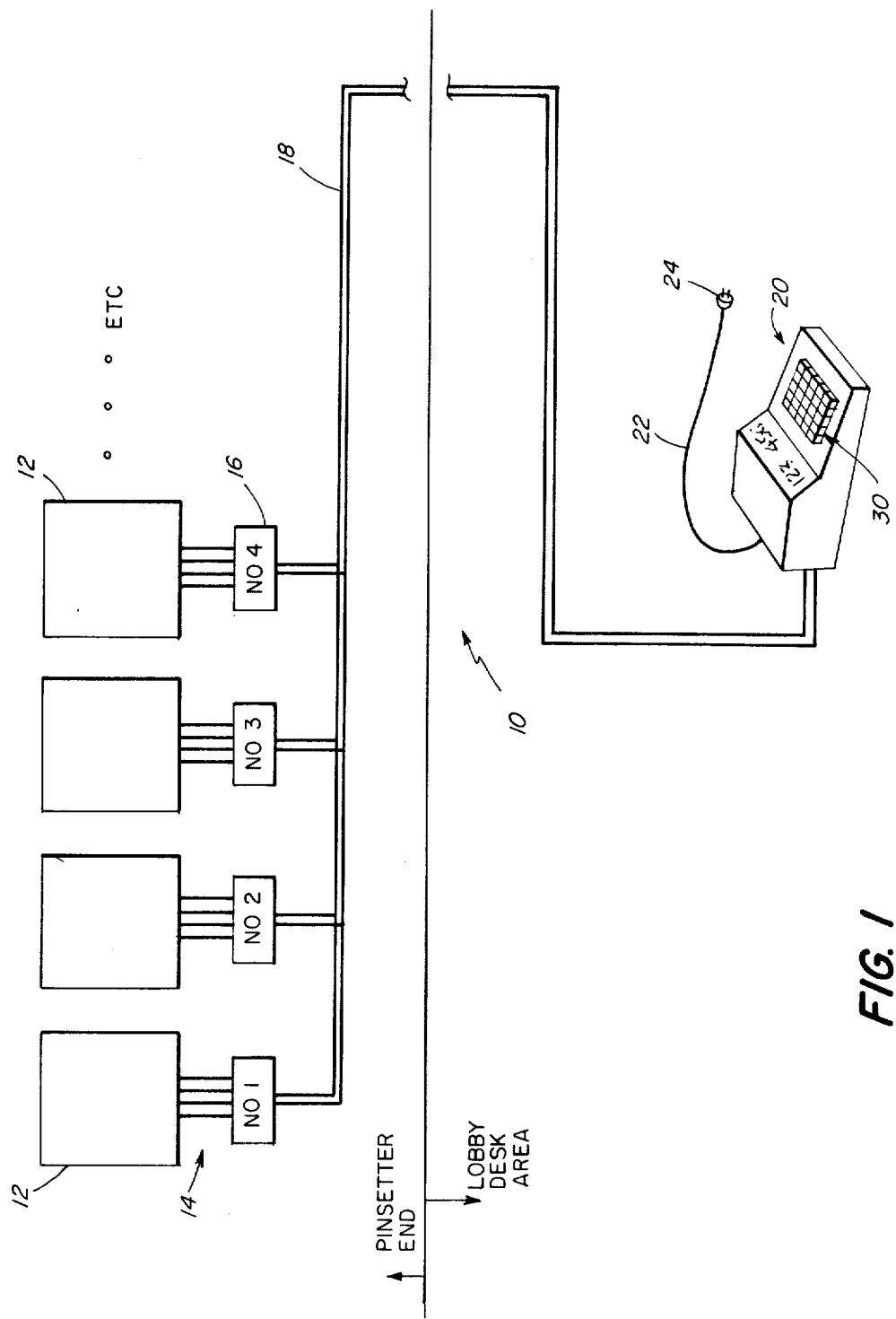
FIG. 1 is a diagrammatic view of the system of the present invention showing the system control console connected by a data bus to a plurality of command decoders located at individual pinsetters.

Referring now to the drawings, wherein similar reference numerals denote similar elements throughout the several views, FIG. 1 illustrates in diagrammatic form the basic configuration of the microprocessor controlled automatic pinsetter controller system 10 of the present invention as it would be installed in a typical bowling alley. At the rear of the bowling alley there are located a plurality of electrically operated automatic pinsetting machines 12. Each pinsetting machine 12 has a plurality of wires 14 exiting from it for the control of its functioning such as turning it on or off, causing it to cycle, counting the cycles it has made, and signalling any malfunction in the machine. The precise number of such wires 14 varies for various makes and models of pinsetters. In the present state of the art these wires 14 are normally bundled for all pinsetters (usually ten to one hundred per bowling alley) and strung to an operator panel where the controls for each pinsetter are displayed and implemented individually. In the present invention system 10 provides a small unit, called a command decoder 16, placed in close proximity to each decoder, at which all control wires 14 terminate. Command decoder 16 is further illustrated in FIG. 3 and described in detail in reference to that Figure hereinafter. As will be explained hereinafter, the essential function of command decoder 16 the conversion of parallel digital signals from wires 14 to serial digital signals for entry into system 10 and the conversion of serial digital signals from system 10 into parallel digital signals for the operation of the pinsetter 12. Each command decoder is able to transmit and receive digital data serially over a common serial data bus 18 which is simply a two wire data bus. Two-wire serial data bus 16 terminates at the operator control console unit 20 which is located at the cashier's desk in the front of the bowling alley. Thus, all pinsetters 12 within system 10, regardless of the number, are connected through command decoders 16 to the operator's console 20 by only the two-wire bus 18. Serial data bus 18 enters control console 20 at the rear. Control console 20 includes a standard power line 22 and male plug 24.

Figure 2:
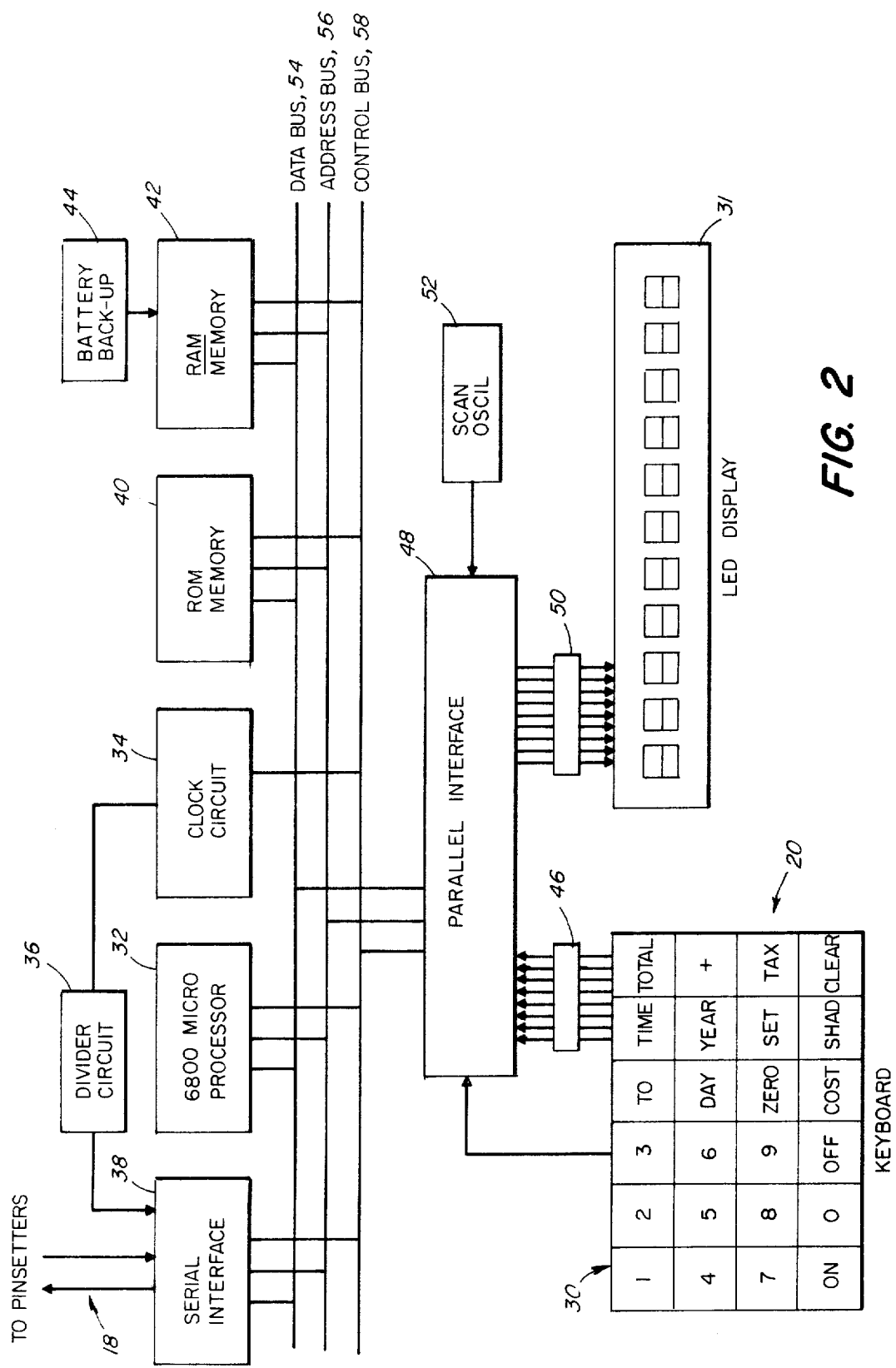
FIG. 2 is a block diagram of the operator system console unit.
Figure 3:
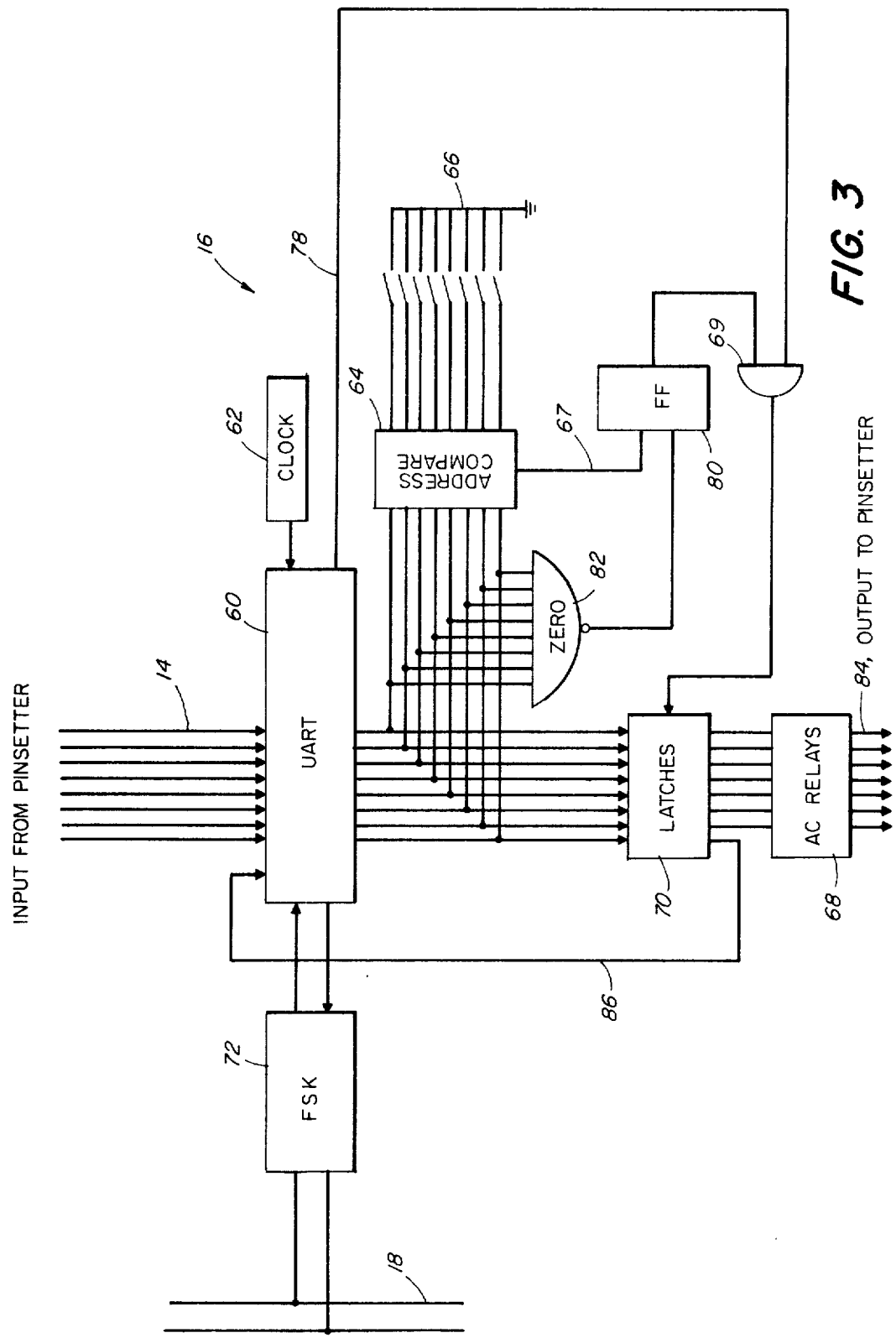
FIG. 3 is a block a block diagram of a command decoder unit.

Operator system control console unit 20 is shown in its exterior perspective view in FIG. 2 and in its block diagram in FIG. 3.

Referring now to FIGS. 1 and 2, system control console 20 has a small housing 26 having a keyboard 28 of twelve keys 30 representing the ten digits, four pinsetter machine functions, six financial function keys and four miscellaneous keys. The keys 30 provide a means for the operator to enter data and commands into system 10 and retrieve information and computations from it. The function of keys 30 will be explained in detail hereinafter. System control console 20 also includes a twelve digit display unit 31 of the LED type to display information to the operator.

Referring now to FIG. 3, which is a block diagram of operator console 20, it can be seen that operator control console is in effect a microcomputer 29. The basic unit within control console 20 is a model MC6800 microprocessor 32 and clock 34 or a 6802 with an internal clock. An MC14040 divider unit 36 is used to control the data rate to an MC6850 serial interface unit 38. A read-only memory 40 (ROM) model 2708 2758 or 2716 is used to store the program for microprocessor 32. A random access memory 42 (RAM), model AM9130 is used to store violatile data. A back-up battery power supply 44 is used to power the RAM in cases of electrical failure so computed data is not lost. Keys 30 are connected to microcomputer 29 through a keyboard encoder 46, model 74C922, to a parallel interface unit 48, model MC6820. LED display 31 also receives its data from parallel interface 48 through display drivers 50. A scan oscillator 52 monitors parallel interface 48. All components of microcomputer 29 are interconnected by a data bus 54, an address bus 56 and control bus 58. microprocessor 32 is the central processing unit. It is controlled by a program permanently stored in the ROM 40. This program is running constantly and it is looking for information coming from or going to the pinsetters 12 through the serial interface. It sends commands out to the pinsetters. Microprocessor 32 is an eight-bit processor. The serial interface unit 38 is used to convert outgoing parallel data to serial data to the data bus 18 and incoming data to parallel data for the computer system 29 to process. Each command decoder 16 has its own address and means for recognition of its address.

The only other interface to the external world for computer 29 is through the keyboard 20 and LED display 31, through parallel interface 48. When a key is pressed, the microprocessor 32 is interrupted to determine what key is pressed and what should be done. This is handled through the program stored in ROM 40. Both keyboard 20 and LED display 31 programs operate independently of the background operating program. Keyboard 20 and LED display 31 are constantly scanned by scan oscillator 52. When scan ocillator 52 determines action is necessary, it interrupts the program. After the program is interrupted and the reason for interrupt is satisfied, the program returns to its normal cycle.

Referring now to FIG. 3, the command decoder 16 in close proximity to a pinsetter 12, receives control wires 14 into a universal asynchronous transmit and receive device (UART) 60 which converts parallel status data from pinsetter 12 to serial digital data. Incoming lines 14 basically report whether pinsetter 12 is off, on, in cycle, jammed or an error condition exists. UART 60 can also receive incoming messages from the control console 20 over data bus 18 through frequency shift keying device (FSK) 72 which converts serial analog tones on the data bus to serial digital data for the UART. The process is reversed for outgoing messages. The UART 60 has two registers, one for incoming messages and one for outgoing messages, and is clocked by clock 62. When all eight bits of an incoming word are assembled in the incoming register, the data ready line 78 goes on and, since the first word should be an address, the address compare 64 is made. If all eight address switches 66 match the address, flip flop 80 is set and subsequent words of the message pass through gate 69 to latches 70. Subsequent words of an incoming message will set latches 70 which, in turn, turn on AC relays to control pinsetter 12. These signals are conveyed over outgoing lines 84. Latches 70 will remain set until inset by a subsequent message. If only the status of pinsetter 12 is requested the first latch 70 will send a status answer over line 86, the transmit data line, to the UART 60 for transmission to the system control console 20. The last word of every outgoing message is a zero which generates a clear pulse by gate 82. After the zero is transmitted flip flop 67 turned off until a subsequent address compare 64 is successful.

SYSTEM OPERATION

Having examined the individual components of system 10, we shall now proceed to describe the operation of system 10, with reference to the prior figures and with specific reference to FIG. 5 which is a flow charg of the system from the operator's point of view.

When all components of system 10 are connected electrically the system is continuous operation. Each pinsetter 12 is electrically connected by control wires 14, 84 to a command decoder 16 having a unique address. Each command decoder 16 is connected in daisy chain fashion to a single two-wire serial data bus 18 which enters the control console 20 through serial interface 38. Console control 20 operating through microprocessor 32 and under the direction of a program stored in ROM 40 continuously cycles through the entire set of command decoders 16, addressing each one serially to determine its status. Each command decoder 16 is questioned by computer 29 and responds with its present status. The status is then stored in the RAM 42 and computer 29 proceeds to query the next command decoder 16, repeating this operation continuously. Microprocessor 32 operating under the control of clock 34 will cycle through the command decoders 16 at a rate of approximately one hundred per second, which is determined by clock divider 36. With computer 29 multiplexing back and forth at this rapid rate and with pinsetter 12 being a relatively slow machine, there is not much that can happen to change the status of a pinsetter during one cycle through the entire alley.

Referring back to FIG. 3, each command decoder 16 is individualized to the make and model of the pinsetter 12 to which it is connected. From the point of view of the computer 29, all command decoders 16 look the same. Any individual differences between the pinsetters 12 are handled by an interface decoder, (not shown), specific to the pinsetter 12 and which is installed in the command decoder 16.

Referring back to system operation, if the control console 20 should be unplugged or have a power failure during its normal operation, all the pinsetters 12 would be turned off. When system console 20 is plugged back in or power is restored, console 20 continues its normal operation. In such a case some pinsetters 12 could be in mid-cycle and turning them on could cause damage. In the event of a momentary power failure, there is often not sufficient time to do this manually. When power is restored, system 10 keeps the pinsetters 12 off until each is inspected by a mechanic. After inspection, all machines can be turned on in one simple keyboard operation, explained later, but the program includes a delay so that the pinsetters 12 come on about one every one-half second to avoid power surges.

In the transmission and reception of information from control console 20 to command decoder 16, each message is sent out in three parts. The decoder 16 responds with or echoes the same message. Control console 20 first sends out an address of a specific command decoder 16. When it receives back that address, it then sends out a command for a status report on the pinsetter 12 at that address. The command decoder 16 will send back a message giving its status such as an error has been produced, it has malfunctioned, it is on or off or it has created a cycle. If the response is information needed for billing, this information is stored under program control in the RAM 42. If the message relates to an error condition, the number of the pinsetter 12 is lit up on LED display 31 and an audio beeper will sound. This method detects a machine malfunction earlier than an operator would normally, thus possibly preventing serious damage to the pinsetter 12. Essentially, the command decoder 16 is sending a status report every time it is queried by the control console 20. Since there is no way to check on the information the pinsetter is sending back, error checking on noise situations is accomplished by averaging the signals received by the command console 20. Since a pinsetter 12 cycle can take about eighteen seconds and since control console 20 is scanning all pinsetters at a rate of about one hundred per second, control console 20 will have received a total of about eighteen hundred messages from all pinsetters while one pinsetter 12 had made one cycle. The control console checks for eight to sixteen identical consecutive messages from each pinsetter 12 which it will have received in less than one second. If all are identical, the status report is accurate. If a few are different, the next sixteen are checked. If most or all of them are different, then an error is signalled.

As mentioned previously microprocessor 32 is under the control of the program stored in ROM 40. The program is running continuously telling microprocessor 32 to check on status and add events up. All the time the program is looking for information coming from or going to the pinsetters 12 through the serial interface 38. It sends out commands to the pinsetters 12 and receives commands back from the pinsetters 12.

The other interface that command console 20 has to the external world is through keyboard 20, and that is handled through the parallel interface 48. When a key 30 is pressed, the microprocessor 32 is interrupted and it then inquires what key is pressed to determine what function it should do. The program determines what should be done and the microprocessor 32 executes the command. Since the program is cycling continuously and rapidly, an interrupt from keyboard 20 causes only delays of a few millionths of a second. The keyboard and the LED display programs, (which is interrupt driven) operate totally independently of the background operating program, which determine totals, costs and so forth.

The scan oscillator 52 constantly scans the LED display 31. Every one-thousandth of a second it interrupts the microprocessor 32, the background program stops and checks the scan oscillator to see if it is the reason for the interrupt. If this is the reason for the interrupt, the program causes the microprocessor 32 to get the information for the LED's and latch it into the display buffers 50, then it returns to its normal cycle in the background program.

The absolute highest priority interrupt is a power failure, as explained earlier. The second priority interrupt would be from a key 30. The third priority interrupt is furnishing a digit to the LED display 31. Handling keyboard 20 and LED display 31 functions requires only about three to four percent of the processing time of microprocessor 32.

When control console 20 receives volatile information, it is stored in the RAM 42 memory, which as mentioned previously, has a back-up battery power supply 44 in the event of a power failure. Depending on the size of the bowling alley, the RAM 42 will hold 1000 to 2000 bytes.

Referring back to FIG. 2, the microprocessor is an eight-bit machine whose code is expressed in a hexadecimal format. When a key is pressed, the program figures out what to do. If the key 30 is a number, it stores the number in the display and waits for the next press. If it is asked to total, it will go to the RAM 42, get the totals and display them. If an inquiry is made to a command decoder 16, an answer comes back through the serial interface 38 with the address of the decoder and some data. The address is held internally. The microprocessor 32 has only two registers. Most of what it deals with is out in one of the memories. When the microprocessor 32 receives the addressed data, it puts the data where it should go in the RAM 42. In the case of any input, the microprocessor 32 checks the program to find out what to do with it. The scan oscillator 52 tells the microprocessor when to display the next digit.

Returning now to FIG. 2, we shall examine the functions of the keys 30 of keyboard 20. Ten of keys 30 represent the digits 0 through 9 and are used to reference lanes or cost figures. Before the operator begins any key input, he should push the CLEAR key to clear out the LED display and any key inputs that may be retained within system 10. To reference a single lane, the operator pushes the digit or digits representing that lane number. To reference a plurality of consecutive lanes, the operator keys in the first lane, the TO key and the number of the last lane desired, such as 1 to 15. To reference a plurality of non-consecutive lanes the operator keys in the first lane number, the PLUS key, the next lane number, and so forth separating each lane number by the PLUS key. The functions of the other keys will be explained in reference to FIG. 4, which is a flow chart of operator inputs.

Figure 4:
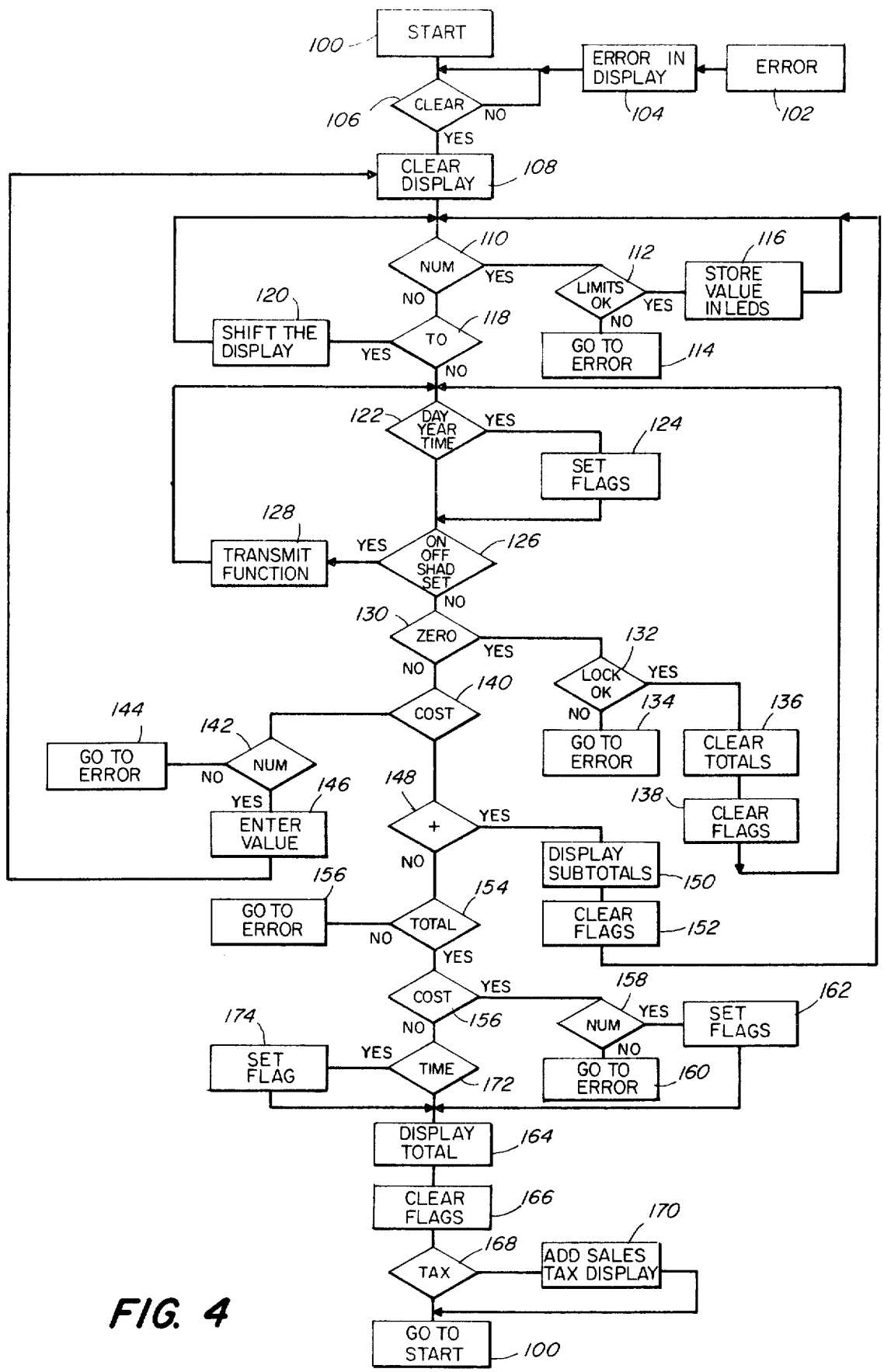
FIG. 4 is a system flow chart from the system operator's point of view.

Referring now to FIG. 4, box 100 represents the system 10 at the start, during which control console 20 is operating continuously under program control as explained heretofore. If there is an ERROR 102 in the system 10, an ERROR IN DISPLAY 104 signal will appear, which is a series of all "eights" in the LED display 31. After the error is corrected, the operator presses CLEAR 106. If the error has not been corrected, this cycle is repeated. If the error has been corrected the LED display 31 is cleared and system 10 is ready for an operator input.

If the first input is a number NUM 110, the program checks to see if the number is within the limits of lane numbers 112 for the program, (when the first keyed input is a number, it must be a lane number). If the number is not within limits, then the program goes to error 114. If the number is within limits, the value is stored 116 in LED display 31 and the program looks for the next keyed input. Assuming a valid lane number is stored, the next input could TO 118. If TO 118 has not been keyed in the program proceeds to the next step. If one of these keys has been pressed, the display is shifted 120 and the program looks for another lane number 110. Assuming only one lane number is entered, the program proceeds to look for either the DAY, YEAR or TIME keys 122. If one of these keys is pressed, flags are set 124. Since these three functions pertain to the financial functions of system 10, they will be discussed infra.

Assuming no flags are set, the program then looks to see if one of the following four keys are pushed ON, OFF, SHAD or SET, 126. These four keys define the machine functions which controller 20 can cause a pinsetter 12 to perform. ON simply turns the pinsetter 12 on. OFF turns the pinsetter 12 off. SET causes pinsetter 12 to go through one cycle to set up all the pins. SHAD is used to permit shadow or practice bowling. After all the pins are bowled over, the pinsetter 12 will not reset them, but it will return the customer's ball. The customer can then practice bowling at a rapid rate without causing pinsetter 12 to recycle. If one of these machine function keys has been pressed 126, then that function is transmitted by the microprocessor to the appropriate command decoder 16 on the pinsetter 12 involved. The continuous cycling of the status of all pinsetters by control console would recognize these above changes of status in the pinsetters 12 involved. The status reports received from the respective command decoders would indicate that the pinsetter 12 was turned on, how many pinsetting cycles it has made, that it was turned off and how long it was on. All this information is stored in the RAM 42 for use in billing the customer.

For purposes of accurate billing of the customer and for purposes of maintaining accurate financial records of all pinsetters 12 in the bowling alley, system 10 accumulates and totals all the data regarding machine functions mentioned above on the basis of a game, a day and a year. This includes both pinsetter 12 cycles and time. After one group of bowlers has finished using a lane and the next group is ready to use the lane, the operator of console 20 must have a means to reduce the game totals to zero again. That is the function of the ZERO key 130. There are also obvious occasions when the owner of a bowling alley will desire to zero out daily and yearly cumulative totals. He may also use the ZERO key to do this but must first unlock a security key-lock switch (not shown) at the rear of console. Normally these totals will be locked in and cannot be cleared from RAM 42 by unauthorized personnel.

Referring back to keys 122, if DAY, YEAR or TIME has been pushed, then flags are set 124, the lock is normally on, and the operator will normally receive an error message if an attempt is made to zero protected totals. If the owner has unlocked the key-lock security switch, system 10 will clear the respective totals 136, clear the flags 138 and return for the next key 30 input. If the operator has keyed in ZERO 130 and no flags were set 124, the program proceeds to clear game totals only for the lanes involved and waits for the next key 30 input.

After having entered a valid number (maximum three digits), the operator enters the COST key 140 followed by a single number 142. The program can store up to ten different rates which may be charged at different times and to different customers such as leagues. If no number 142 is entered, the program goes to error 144. If a valid number is entered 142 the value is entered 146, the display is cleared 108 and the program waits for another input from a key 30.

If the cost key 140 is not entered, the program looks for a + key 148. If + is entered, a subtotal is displayed, 150 flags are cleared 152 and the program waits for another key 30 input.

If a + key is not entered the program checks to see if a TOTAL key 154 is entered. If TOTAL 154 is not entered, it goes to error 156. If TOTAL 154 is entered, the program looks to see if COST 156 is entered. This number would be the applicable rate to be used. If a number 158 is not entered, the program goes to error 160. If a number 158 is entered, a flag 162 is set, and the program proceeds to display a total 164 cost for the lanes entered, the total requested being for a game or time only, at the cost rate entered. The flags are then cleared 166 and the program looks for the TAX key 168 input. If no TAX 168 is required, the program returns to a START 100. If a TAX 168 is keyed, the tax is added to the TOTAL display 170 and the program returns to its START 100.

Returning now to COST key 156, if a TOTAL 154 is requested and COST 156 is not keyed the program looks for the TIME key 172. If this key is pressed a flag is set 174 and the relevant time totals are displayed 154, the tax 168 if applicable is displayed 170, and the program returns to start.

To simplify the flow chart to FIG. 4, several examples will be presented. When a person enters the alley to bowl, he goes to the desk to request a lane. Meanwhile system 10 is continuously cycling. The operator assigns the bowler to lane 5 by keying in CLEAR 106, to clear any prior keyboard 20 entries and his LED display 31. He then keys in 5, 110 and ZERO 130 to reduce the game totals for lane 5 to zero. The operator then keys ON 126 to turn lane 5 on for the bowler. From this point forward, system 10 will begin to accumulate time and cycle counts for lane five. It will accumulate the game and time totals starting from zero, and continue to accumulate them for the game, day and year also, both lineage and time totals, all of which are stored in the RAM 42. After the bowler is finished using lane 5, he reports to the operator of console 20 who then keys in 5-110 and OFF 126. Lane 5 is now turned off and the console operator then proceeds to determine the bowlers' costs. The operator then keys in TOTAL 154, COST 156 and a number 158 to set the rate and then the number of frames bowled will be displayed and the cost to the bowler will be displayed. If a tax is applicable, the operator keys in TAX 168 and the applicable tax is added to and displayed in the customer's total cost in the display 170.

If the operator so desires, he can key in TOTAL 154, TIME 122 and receive a display of the total time that lane five was in use. By utilizing appropriate keys, he can also cause to be displayed the cumulative time or lineage or totals for lane five for the day or year.

If the operator wishes to initiate and terminate these sequences for a plurality of lanes at one time, he may do so by referencing plurality of lanes in the two ways described above.

Following the flow chart of FIG. 4, it is obvious that the operator of console 20 can command all relevant functions of pinsetter 12 and can cause to be displayed all the time and lineage information relevant to a lane or a set of lanes on a game, day or yearly basis.

I claim:

1. An automatic pinsetter controller system for providing electrical and financial controls over the utilization of automatic pinsetting machines in a bowling alley comprising:

a digital data decoding means attached to each pinsetter in a bowling alley having means to receive parallel digital status data from its attached pinsetter, having means to transmit said digital status data to a computer; having means to receive serial digital status queries and commands for its attached pinsetter and having means to answer said queries and cause said pinsetter to okay said commands;

a two-wire serial data bus which sends and receives said serial digital data and commands to and from each of said digital data decoding devices to said central computer;

a central operator control computer console means which receives and records all said serial digital data from each of said decoding devices and which under program control transmits saids status queries and machine commands to each of said decoding devices for the control and operation of its individual pinsetter, all of said transmissions being over said serial data bus;

a keyboard data entry means on said computer console to permit operator commands and queries for data to be transmitted to said computer and to said pinsetters; and a light emitting diode display means on said computer console to display to an operator his command and query entries and the responses thereto.

2. The automatic pinsetter controller system of claim 1 wherein each of said digital data decoding means further comprises:

a clocked universal asynchronous receive and transmit device having a register for incoming messages and a register for outgoing messages to and from its associated pinsetter and to and from said central computer console and having means to convert serial digital data to parallel digital data and parallel digital data to serial digital data;

a plurality of input wires sending parallel digital status data from its associated pinsetter to the incoming message register of said universal asynchronous receive and transmit device;

a frequency shift keying device between said serial data bus and said universal asynchronous receive and transmit device to convert signals between these devices;

address compare circuitry to enable each of said digital decoding devices to determine if a query or command pertains to its associated pinsetter;

a flip-flop being set by a favorable address compare;

a data ready line to transmit messages throughout said digital decoding device;

a plurality of latches, each of which may be set according to the commands and queries received;

a plurality of AC relays responding to pinsetting machine commands recorded in said latches;

a plurality of wires from said AC relays to said associated pinsetting machine;

one of said latches being a status latch;

a transmit data wire from said status latch to said universal asynchronous receive and transmit device;

zero function circuitry to transmit a zero at the end of each transmitted message and to zero out all circuits whose function is completed including said address compare circuit, said address switches, said data ready line and said flip-flop.

3. The automatic pinsetter controller system of claim 1 wherein said serial data bus is a two-wire data bus connected sequentially to each of said digital data decoding devices, each of which has a unique digital address at one end and connected to a computer console at its other end.

4. The automatic pinsetter controller system of claim 1 wherein said central operator computer control console means further includes:

a serial to parallel data interface device to permit conversion of data to and from said serial data bus;

a clocked microprocessor which serves as the central processing unit of said operator computer control console which transmits data to and from said serial to parallel data interface;

a read-only-memory which stores the operating program for said microprocessor;

a random access memory which stores all the volatile data collected from said pinsetters or inputted into the system by an operator;

battery-powered means to retain said volatile data in said random access memory in the event of a power failure;

a parallel interface between said operator keyboard means and display means; and a plurality of data buses interconnecting said computer console components, one being an address bus, one being a data bus and one being a control bus.

5. The automatic pinsetter controller system of claim 1 wherein said keyboard data entry means further comprises:

a keyboard having a plurality of keys;

ten of said keys representing the decimal digits;

four of said keys representing pinsetting machine commands;

six of said keys representing financial functions;

the remainder of said keys representing input convenience functions;

a keyboard encoder to translate the electrical impulse from each of said keys to a digital data signal to be receognized by said parallel interface.

6. The automatic pinsetter control system of claim 1 wherein said light emitting diode display means further includes:

a plurality of light emitting diodes to permit a display of a large number of digits;

a plurality of buffers and dividers to interface said display means with said parallel interface; and a scan oscillator constantly interrupting said parallel interface for any data to be sent to said display device when necessary.

7. The automatic pinsetter controller system of claim 1 wherein said system counts and records in its random access memory the number of times each pinsetter connected to the system goes through a pinsetting cycle and the time each pinsetter is turned on and accumulates said totals for each game, each day and each year, and can cause said totals to be displayed on said display device.

8. The automatic pinsetter controller system of claim 1 wherein said keyboard data entry means permits the entering of varying costs for the utilization of said pinsetters on both a time and cycle basis.

9. The automatic pinsetter controller system of claim 1 wherein said keyboard data entry means permits the operator to cause said computer to compute the customer cost of utilization of at least one pinsetter by the entry of a lane number, a cost rate and a tax rate, and to cause said information to be displayed on said display device.

* * * * *